June 10, 1924.
M. S. DUNKELBERGER
COMBINED FISHING ROD AND REEL
Filed Oct. 31, 1921
1,497,364
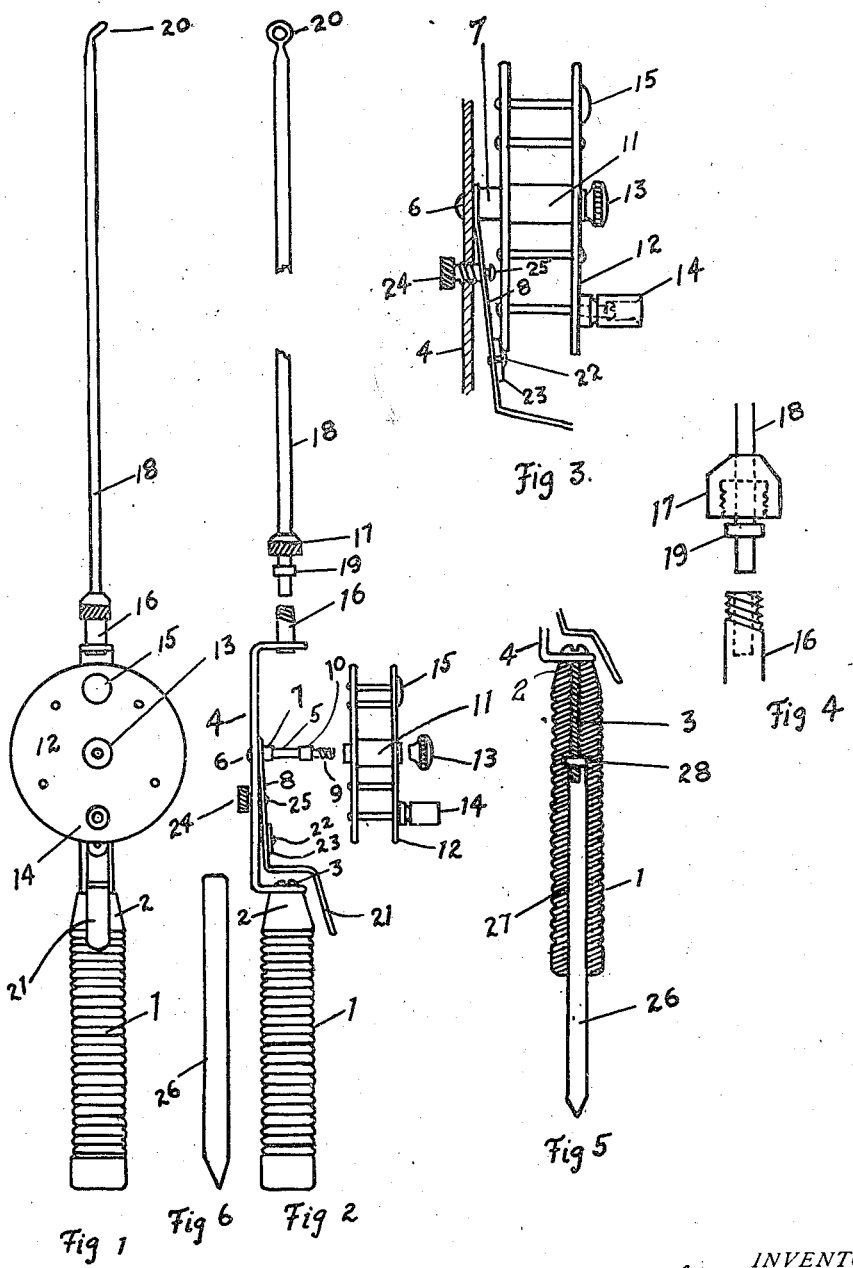

Patented June 10, 1924.

1,497,364

UNITED STATES PATENT OFFICE.

MILTON S. DUNKELBERGER, OF DAYTON, OHIO.

COMBINED FISHING ROD AND REEL.

Application filed October 31, 1921. Serial No. 511,571.

*To all whom it may concern:*

Be it known that I, MILTON S. DUNKELBERGER, a citizen of the United States, residing at Dayton, in the county of Montgomery and State of Ohio, have invented certain new and useful Improvements in Combined Fishing Rods and Reels, of which the following is a specification.

The principal object of my invention is to provide a fishing rod having an offset portion in which a reel is mounted, so that the center of the reel will come in line with the center of the rod. This enables a more direct pull to be made on the line by the reel than when the latter is located at the side of the rod.

It is another object of my invention to provide a combined fishing rod and reel that may be easily taken apart, so that the different parts may be compactly grouped for carriage in a coat pocket or other small space.

Other important and incidental objects will be brought out in the following specification and particularly set forth in the subjoined claims.

In the accompanying drawings, Figure 1 is a front elevational view of my combined fishing rod and reel. Figure 2 is a side elevational view thereof, with the reel shown removed from its bearings and the rod disconnected from the reel frame. Figure 3 is an enlarged side view of the reel and the adjustable brake therefor, with the reel frame shown in section. Figure 4 is an enlarged detail view of the screw joint for receiving the rod. Figure 5 is a sectional view taken through the handle, showing how the reel frame is secured thereto and how the rod setting pin is received thereby. And Figure 6 is a side view of the rod setting pin.

Throughout the specification and drawings, similar reference characters denote corresponding parts.

Referring to the accompanying drawings for a detailed description of the preferred form of embodiment of my invention, the numeral 1 designates a cylindrical handle that is preferably corrugated and whose inner end tapers inwardly to form a truncated conical screw-receiving portion 2. Secured to the latter by means of an elongated screw 3, is one right-angled end of a reel frame 4. (See Figures 1, 2 and 5.)

Secured to the middle portion of the reel frame 4, at right angles thereto, is the inner end of a reel axle 5. The latter has a rivet head 6 adapted to press against the outer side of the reel frame 4, and an inner enlarged bearing portion 7 between which and the inner side of the reel frame there is secured one end of a steel drag spring 8. (See Figures 2 and 3.)

The reel axle 5 has an outer screw-threaded end 9 between which and the bearing portion 7, said axle has an enlarged bearing portion 10. Adapted to turn on the bearing portions 7 and 10 of the axle 5, is the hub 11 of a reel 12, the latter being held on said axle by a retaining nut 13 which screws on the threaded portion 9 of the axle. (See Figures 2 and 3.) Secured to reel 12 is a handle 14 and a counterbalance 15 for the latter.

Secured to the outer right-angled end of the reel frame 4 is a ferrule 16 having an externally threaded outer end to receive a ferrule cap 17. The latter has a free longitudinal movement on the inner end of a rod 18 between a collar 19 on the lower end of the latter and an eyelet 20 on its outer end. The inner end of the rod 18 is adapted to be inserted in the ferrule 16 until the collar 19 engages it, whereupon the cap 17 may be screwed over it onto the threaded end of the ferrule. The rod is free to turn in the ferrule until the cap 17 is screwed tightly upon it, which causes the collar 19 to be pressed so tightly against the top of the ferrule that the rod cannot turn. It is thus possible by loosening the ferrule cap to permit the rod 18 to be readily turned, and by tightening it, to hold the rod against rotation. (See Figures 2 and 4.)

The adjustable brake for the reel will now be described. Referring to Figures 1, 2 and 3, the drag spring 8 projects downwardly to a point below the inner disc of the reel 12, then outwardly over the screw 3, and then downwardly and outwardly to provide a thumb receiving portion 21. Secured by a rivet 22 to the reel frame 4 in a position to engage the inner disc of the reel 12, is a braking disc 23 preferably constructed of bakelite. The drag spring 8 is under sufficient tension to press the disc 23 tightly against the reel to exert considerable braking force upon it when fishing in a stiff current. When fishing in still water or when playing with a fish, the fisherman may release or modify this braking force by the following means.

Referring to Figures 2 and 3, there projects through a threaded hole in the reel frame 4 near the axle 5, a thumb screw 24 that terminates at its inner end in a rivet head portion 25. Between the latter and its threaded part, the screw 24 has a reduced portion that passes through the drag spring 8 whereby, when the screw is turned in one direction, it will draw the spring away from the reel 12 to reduce the pressure of the brake disc 23 thereon. This pressure will be reduced in proportion to the distance the screw 24 is turned, to permit the reel to be more freely rotated by a running fish or for other reasons. And when the screw 24 is turned in a reverse direction, it will permit the brake disc 23 to be forced by the spring into tighter engagement with the reel. It is thus possible to readily adjust the amount of braking pressure which the disc 23 exerts upon the reel. This pressure may also be released or modified by pressing the thumb against the portion 21 of the drag spring 8.

For the purpose of leaving the rod in a fishing position on the ground, or in the oar lock of a boat or other place, a setting pin 26 is provided. One end of this pin is pointed for insertion in the ground, while its other end is adapted to project into an elongated hole 27 in the outer end of the handle 1. The inward movement of this pin into the handle 1 will be limited by the lower end of the screw 3, which projects a sufficient distance into the hole 27 in the handle to receive a nut 28. The latter is adapted to be drawn tightly against that portion of the handle 1 which is above the elongated hole 27, when the screw 3 is turned, to firmly secure said handle to the reel frame 4. (See Figures 5 and 6.)

When it is desired to leave the rod in a stationary fishing position, the pin 26 is forced into the ground at a selected point and the handle 1 of the rod slipped over it. Thereafter the handle may be pulled from the pin, and the rod portion 18 disconnected from the reel frame 4 by unscrewing the cap 17 from the ferrule 16, to enable these separated parts to be compactly grouped for carriage in the pocket or other small receptacle.

I do not wish to be limited to the details of construction and arrangement herein shown and described, and any changes or modifications may be made therein within the scope of the subjoined claims.

Having described my invention, I claim:

1. In a device of the type described, the combination with a handle, of an offset reel frame secured thereto, a reel rotatably secured in said frame in line with said handle, a rod secured to said reel frame in line with said reel, a brake spring one end of which is secured to said reel frame, and the other end of which inclines downwardly and outwardly for engagement with said reel, and then outwardly above the top of the handle, and then downwardly along the handle for the purpose described.

2. In an apparatus of the class described, the combination with a frame and a rotary reel, of a brake device on said frame between the frame and the reel, said brake device comprising an angle piece of material fastened at its inner end to said frame, a handle attached to said frame, said handle provided with a flat, inclined, bevelled portion registering with one end of the frame, said angle piece of material provided with a flat thumb-engaging outer portion adapted to press snug against the flat inclined portion of the handle and the registering end of said frame, and a piece of material on the angle piece of material, adapted to engage the reel for braking the same, substantially as shown and described.

3. In an apparatus of the character described, a frame having a side and ends, a rod extending from one end of said frame, a handle extending from the other end of the frame, a reel rotatably mounted between the ends of said frame, and a brake for said reel formed of a strip of resilient material secured to said frame and extending towards the handle carrying end thereof beyond the periphery of the reel and bent to extend between the reel and the said end and having its free end portion bent to extend partially along said handle whereby pressure may be applied to move the brake out of engagement with the reel.

4. In an apparatus of the class described, a frame, a handle extending from said frame, a reel rotatably carried by said frame, and a brake for said reel formed from a strip of resilient material secured to said frame and extending beyond the periphery of the reel and bent to provide an operating portion extending partially along said handle in spaced relation thereto, whereby pressure may be applied to move the brake strip against its own resiliency out of engagement with said reel.

In testimony whereof I have hereunto set my hand this 29th day of October, 1921.

MILTON S. DUNKELBERGER.

Witness:
HOWARD S. SMITH.